US007000757B1

(12) United States Patent
Schlegel et al.

(10) Patent No.: US 7,000,757 B1
(45) Date of Patent: Feb. 21, 2006

(54) STACKER RECLAIMER APPARATUS

(76) Inventors: Hans J. Schlegel, 3601 84th Circle North, Minneapolis, MN (US) 55443-2767; Helmut Wolf, Sielkemp 52, 38112 Braumschweig (DE)

( * ) Notice: Subject to any disclaimer, the term of this patent is extended or adjusted under 35 U.S.C. 154(b) by 0 days.

(21) Appl. No.: 10/942,540

(22) Filed: Sep. 16, 2004

(51) Int. Cl.
*B65G 65/02* (2006.01)

(52) U.S. Cl. .................... 198/519; 198/861.4; 414/133

(58) Field of Classification Search ................ 198/508, 198/519, 861.4, 861.6; 414/133
See application file for complete search history.

(56) References Cited

U.S. PATENT DOCUMENTS 3,297,141 A * 1/1967 Janitsch et al. ............. 109/519
3,767,031 A * 10/1973 Gorgei et al. ............ 198/861.4
4,213,724 A * 7/1980 Holderness ................. 414/133
4,244,463 A 1/1981 Bartley ....................... 198/508
4,319,677 A * 3/1982 Kipper ....................... 414/133
4,363,396 A 12/1982 Wolf et al. ................. 198/508
4,629,060 A 12/1986 Schlegel et al. ............ 198/508
5,310,121 A * 5/1994 Nilson et al. ................. 241/27
5,613,820 A * 3/1997 Tschernatsch ............... 198/519

* cited by examiner

*Primary Examiner*—James R. Bidwell
(74) *Attorney, Agent, or Firm*—Butler Snow O'Mara Stevens & Cannada, PLLC

(57) ABSTRACT

The present invention relates to an improved stacker reclaimer apparatus for building up and discharging bulk material. The improved stacker reclaimer apparatus includes only one stacker bearing to separate the stacker machine from the reclaimer machine. A torque reaction member is rotatable connected to the stacker upper column. The torque reaction member is made of an arm portion and a torque arm bearing frame.

17 Claims, 7 Drawing Sheets

STACKER RECLAIMER APPARATUS

RELATED APPLICATIONS

Not Applicable

STATEMENT REGARDING FEDERALLY SPONSORED RESEARCH OR DEVELOPMENT

Not Applicable

REFERENCE A "MICROFICHE APPENDIX"

Not Applicable

FIELD OF THE INVENTION

The present invention relates to an improved apparatus for building up and discharging bulk material.

BACKGROUND OF THE INVENTION

The prior art apparatus for handling bulk material as located at a storage site have several versions of the well known stacker-reclaimer apparatus. Many of these apparatuses, as shown in FIG. 1, have a central column to which the stacker and reclaimer are connected via bearings. These apparatuses with a central column require at least three bearings to separately operate the reclaimer from the stacker. Bearings of the size needed to function in a stacker-reclaimer apparatus can cost in excess of $100,000.00. A configuration of the apparatus that would reduce the number of bearings without adding additional columns would provide a financial advantage. See also U.S. Pat. No. 4,363,396. In this embodiment, a circular rail functions as the third bearing to support the reclaimer.

Another version of the stacker reclaimer apparatus as described in U.S. Pat. No. 4,629,060 uses an incline column to replace the central column and torque arm. In this configuration there is only one stacker bearing as the stacker weight is carried by the incline column. An additional incline column, however, substantially raises the cost of the apparatus.

In another embodiment, shown in U.S. Pat. No. 4,244,463 uses a fixed center column attached to a foundation. In this apparatus, the stacker, reclaimer and wing feeder unit each have one bearing which are stationarily mounted to the fixed column to permit all three units to rotate independently.

BRIEF SUMMARY OF THE INVENTION

The present invention provides an improved stacker-reclaimer apparatus wherein only one stacker bearing separates the stacker machine from the reclaimer machine. This is accomplished by applying the end of a torque reaction member at the column as a loose member around the upper stacker column. More specifically, a stacker-reclaimer apparatus is provided which is made of a stacker machine having an upper column and a lower column, wherein the upper column and lower column are connected through a stacker bearing. The apparatus is also made of a torque reaction member rotatably connected to the stacker upper column. A torque reaction member is rotatably connected to the upper stacker column via a torque arm bearing frame. The torque arm bearing frame is connected to a plurality of rollers. The vertical rollers contact on a circumferential support member which is fixedly attached to the stacker upper column. The horizontal rollers contact the outer periphery of the circumferential support member. In an alternative embodiment, plastic slides can be used instead of rollers. The slewing motion can be controlled by a rotational drive assembly connected to the torque reaction member. Additionally, the apparatus is made of a reclaimer machine positioned to support the stacker lower column.

DETAILED DESCRIPTION OF THE INVENTION

Figure 1:
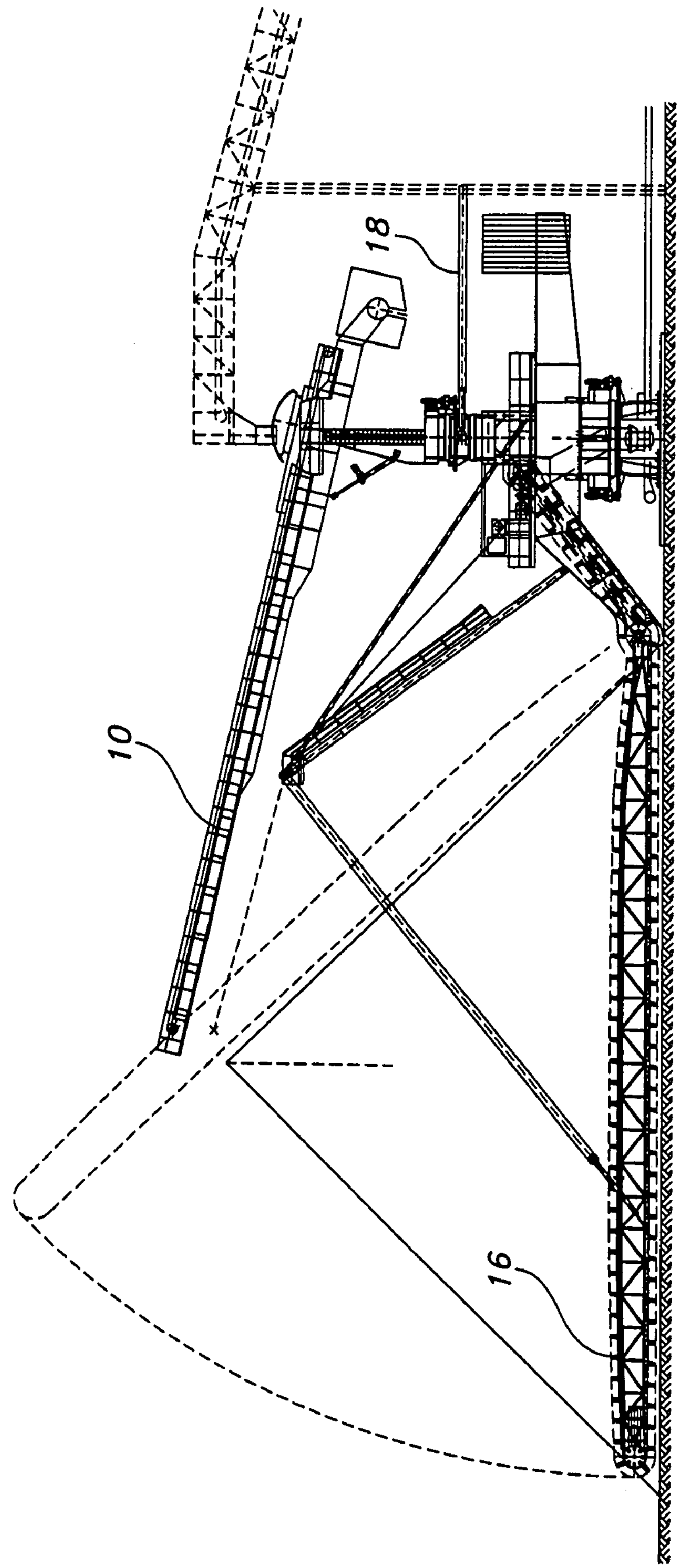
FIG. 1 is an elevation view of a complete typical stacker-reclaimer machine of existing art, with reclaimer supported on a slewing bearing and stacker supported on the reclaimer structure.
Figure 2A:
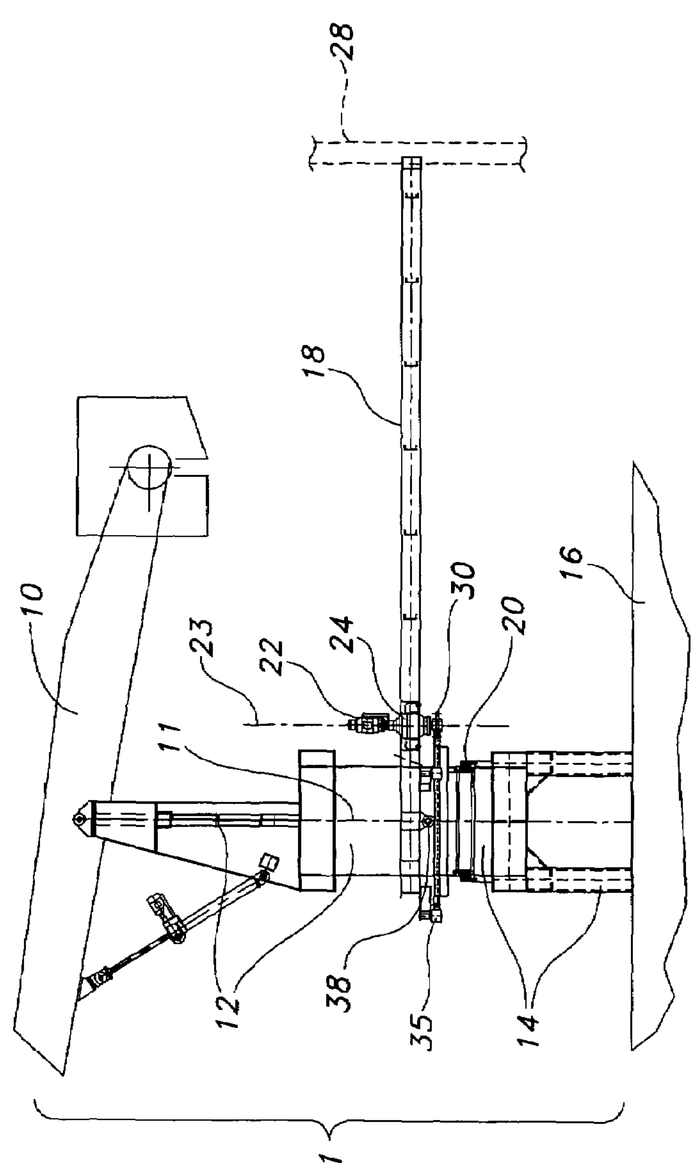
FIG. 2A is a partial elevation view of the stacker bearing, torque arm support rollers and stacker rotational drive arrangement.
Figure 2B:
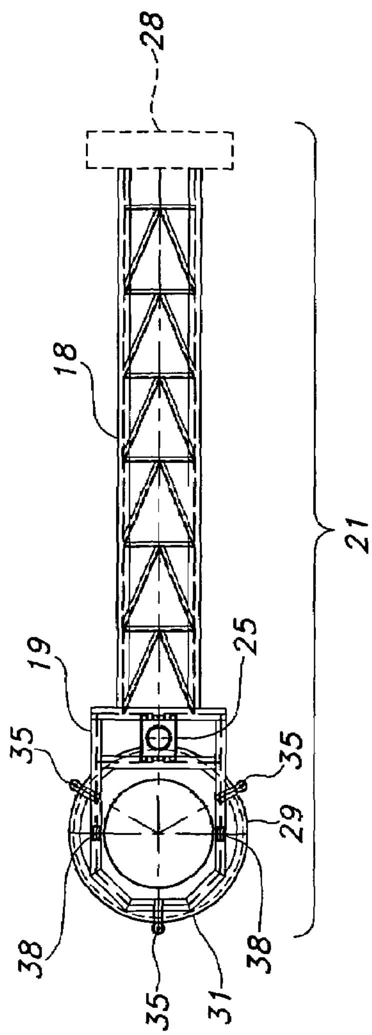
FIG. 2B is a plan view of 2A.
Figure 3:
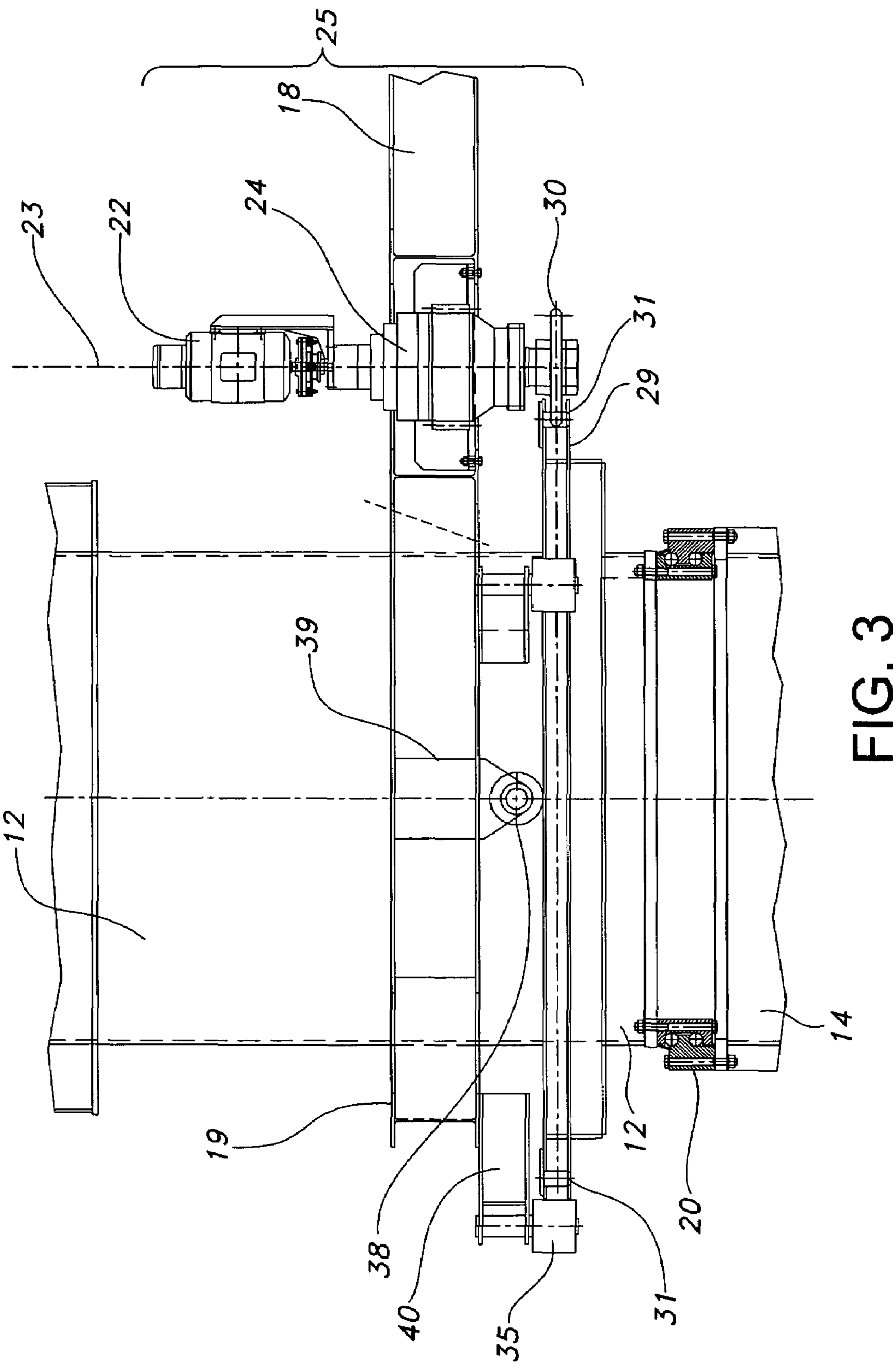
FIG. 3 is a partial elevation view of 2A of the new stacker slewing bearing and torque reaction member arrangement.

Now referring to FIGS. 2A, 2B, and 3, a stacker-reclaimer apparatus 1 is an apparatus for conveying loose bulk material such as wood chips or gravel from a first location to a second location. In the preferred embodiment of the present invention, a stacker machine 10 is shown having a stacker upper column 12 and stacker lower column 14. A stacker rotational bearing 20 is mounted to stacker lower column 14. The stacker upper column 12 is rotatably mounted to stacker bearing 20. The stacker bearing 20 allows the stacker machine 10 and reclaimer machine 16 to slew independently. The stacker bearing 20 is ball or a roller bearing. The reclaimer machine 16 is below, but not shown in detail.

A torque reaction member 21 is made of an arm portion 18 and a torque arm bearing frame 19. The torque arm 18 projects perpendicularly away from the stacker upper column 12 and can be attached to an external support leg 28. A torque arm reaction member 21 functions to support and counteract the torque reaction generated when stacker machine 10 is rotated. Typically referred to in the art of stacker-reclaimers as a torque arm, a torque reaction member 21 connects a portion of the stacker-reclaimer apparatus 1 which should be prevented from rotating to a fixed point relative to the ground. Since large torques can be generated in the operation of the machine, a long torque reaction member 21 is usually required. A torque reaction member 21 in the context described herein provides a stationary mount for the stacker rotational drive assembly 25 so that rotational commands can be imported to the stacker upper column 12 and stacker boom 10 without rotational motion being transferred from the stacker lower column 14 or reclaimer 16 or vice versa. Alternatively, torque arm 18 and torque arm bearing frame 19 can be made as one unit rather than as two distinct pieces.

The torque arm bearing frame 19 is sized to surround and is applied as a loose member around the stacker upper column 12. The term sized to surround the upper stacker column means that the torque arm bearing frame 19 surrounds the upper stacker column 12 but does not contact it. This is accomplished in the preferred embodiment by providing a circumferential support member 29 attached to the stacker upper column 12 fixedly disposed below the torque arm bearing frame 19. Circumferential support member 29 is a substantially horizontal surface fixedly attached to a stacker upper column 12. In a preferred embodiment circumferential support member 29 is a metal plate stiffened with gussets (not shown) underneath the plate to support the weight of the torque arm 18 and torque arm bearing frame 19 (which encircles the stacker column 12). Further to the preferred embodiment, the circumferential support member 29 is constructed of two plates with gusset plates arranged in between the plates to form a stiff structure. Yet further to the preferred embodiment, circumferential support member 29 contains bull gear 31 along its circular periphery.

The torque reaction member 21 is rotatably connected to the stacker upper column 12. In the preferred embodiment, this rotatable connection is achieved by using a plurality of vertical rollers 38 connected to the torque arm bearing frame 19. The plurality of vertical rollers 38 are connected to the torque arm bearing frame 19 by means of brackets 39. The brackets 39 are sized and positioned to provide support for the plurality of vertical rollers 38 as they contact circumferential support member 29. The vertical rollers 38 rest on the top surface of circumferential support member 29. In this embodiment, there are at least two vertical rollers. Additionally, a plurality of horizontal rollers 35 are connected to the torque arm bearing frame 19 and roll horizontally on the periphery of circumferential support member 29. The plurality of horizontal rollers 35 are connected to the torque arm bearing frame 19 by means of brackets or adapter blocks 40. The brackets 39 are sized and proportioned so as to position the plurality of horizontal rollers 35 to contact the portion of the outer periphery of the circumferential support member 29 on which the plurality of horizontal rollers 35 roll.

The circumferential support member 29 may have a step or shoulder on which the plurality of horizontal rollers 35 make rolling contact that is either larger or smaller in diameter than the exact outer periphery of the circumferential support member 29. More specifically, the torque arm bearing frame portion 19 supports a plurality of vertical rollers 38 and a plurality of horizontal rollers 35 in positions concentric with stacker upper column 12. The plurality of vertical rollers 38 allow the torque arm 18 to sit on the circumferential support member 29.

In this invention, the torque arm 18 also functions to support stacker rotational drive assembly 25 made up of motor and brake 22, speed reducer 24 and pinion gear 30. The end of the torque arm 18 is attached to a support leg 28, which typically supports the bulk material infeed conveyor, not shown in detail. The bull gear 31 of circumferential support member 29 is attached to the upper column 12 and is in mesh with pinion gear 30. Thus, to control the stacker upper column 12, a motor assembly including a motor and brake 22, speed reducer 24 and pinion 30 are mounted on the torque arm bearing frame 19 in the preferred embodiment. The driver pinion 30 is operably connected to the bull gear 31 of the circumferential support member 29 to power the rotational movement of the stacker upper column 12 and stacker machine 10. The horizontal rollers 35 function to keep pinion gear 30 in proper mesh with the bull gear 31 of circumferential support member 29. The vertical center axis 11 of the upper stacker column 12 and the vertical center axis 23 of the stacker drive assembly 25 are parallel.

The torque arm 18 does not move since the far end is attached to a support leg 28 which typically supports the infeed conveyor (not shown). However, the stacker rotational drive assembly 25, which is made of the motor and brake 22, and speed reducer 24 and pinion gear 30 are fixedly attached to the torque arm 18 so that torque from the pinion gear 30 can be applied to the bull gear 31 which connected to the stacker upper column 12, resulting in rotation of stacker upper column 12 and hence the stacker conveyor boom 10.

Now referring to FIG. 3, an enlargement of FIG. 2A is shown in which stacker bearing 20 is mounted to stacker lower column 14. Further, stacker upper column 12 is shown attached to stacker bearing 20 and circumferential support member 29 which is attached to stacker upper column 12 and is shown supporting bull gear 31. The plurality of vertical rollers 38 are connected to torque arm bearing frame 19 through bracket 39. The plurality of vertical rollers roll on the top of circumferential support member 29. Horizontal rollers 35 are connected through bracket 40 to torque arm bearing frame 19 and roll around outside edge of bull gear 31. Motor and brake 22, speed reducer 24 and pinion gear 30 are shown attached to torque arm 18 and torque arm bearing frame 19.

Figure 4:
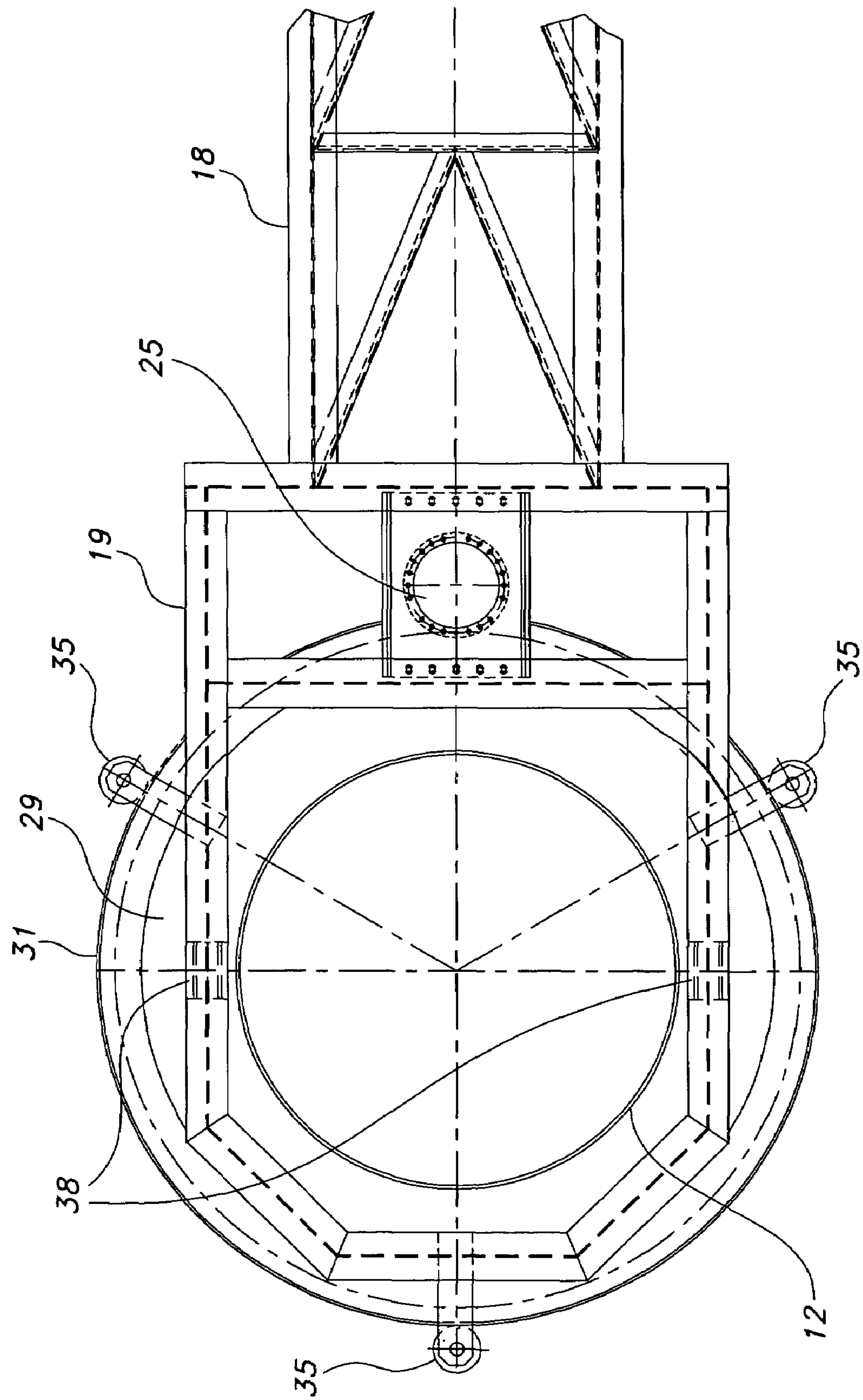
FIG. 4 is a partial plan view of FIG. 2B showing details of the support rollers and stacker rotational drive arrangement.

Now referring to FIG. 4, torque arm 18 and torque arm bearing frame 19 can be seen supporting attached plurality of vertical rollers 38 and plurality of horizontal rollers 35 which roll on the top surface and outer edge, respectively of circumferential support member 29 and bull gear 31. The stacker-reclaimer drive assembly 25 can be seen from the top attached to torque arm 18 and torque arm bearing frame 19. The plurality of vertical rollers 38 and the plurality of horizontal rollers 35 keep torque arm bearing frame 19 concentrically located with respect to stacker upper column 12. The plurality of rollers 38 and 35 further keep pinion gear 30 (shown in FIG. 3) in proper mesh with bull gear 31 of circumferential support member 29.

Figure 5:
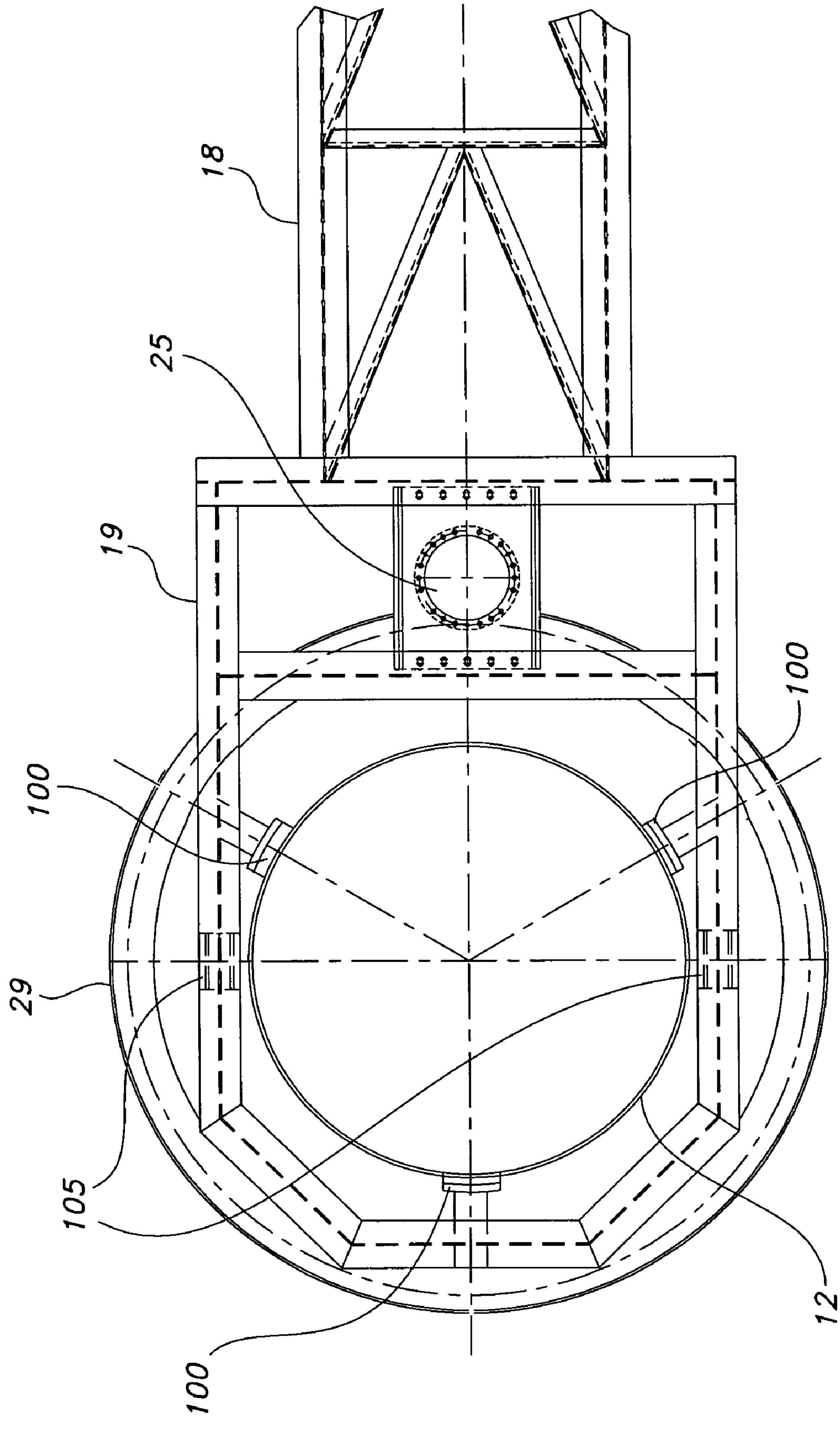
FIG. 5 is a partial plan view showing an alternate embodiment for sliding supports locating the torque arm relative to the stacker column.

Now referring to FIG. 5, an alternate embodiment of the torque arm support arrangement is shown using plastic guides instead of rollers. A plurality of vertical guides 105 support part of the weight of the end of torque arm 18 and torque arm bearing frame 19. A plurality of horizontal guide 100, in the preferred embodiment, are positioned to contact the upper stacker column 12. In an alternate embodiment, the plurality of horizontal guides 100 are positioned to contact (not shown) the circumferential support member 29. The plurality of horizontal guides 100 keep torque arm bearing frame 19 concentrically located with respect to stacker upper column 12. The plurality of guides 100 and 105 further keep pinion gear 30 in proper mesh with bull gear 31 of circumferential support member 29. Guides 100 and 105 are made from solid plastic, such as ultra high molecular weight polyethylene (UHMW) or the like. In a preferred embodiment, the plurality of guides 100 and 105 are rectangularly shaped with dimensions of about 8 to 10 inches and about two inches in thickness.

Figure 6:
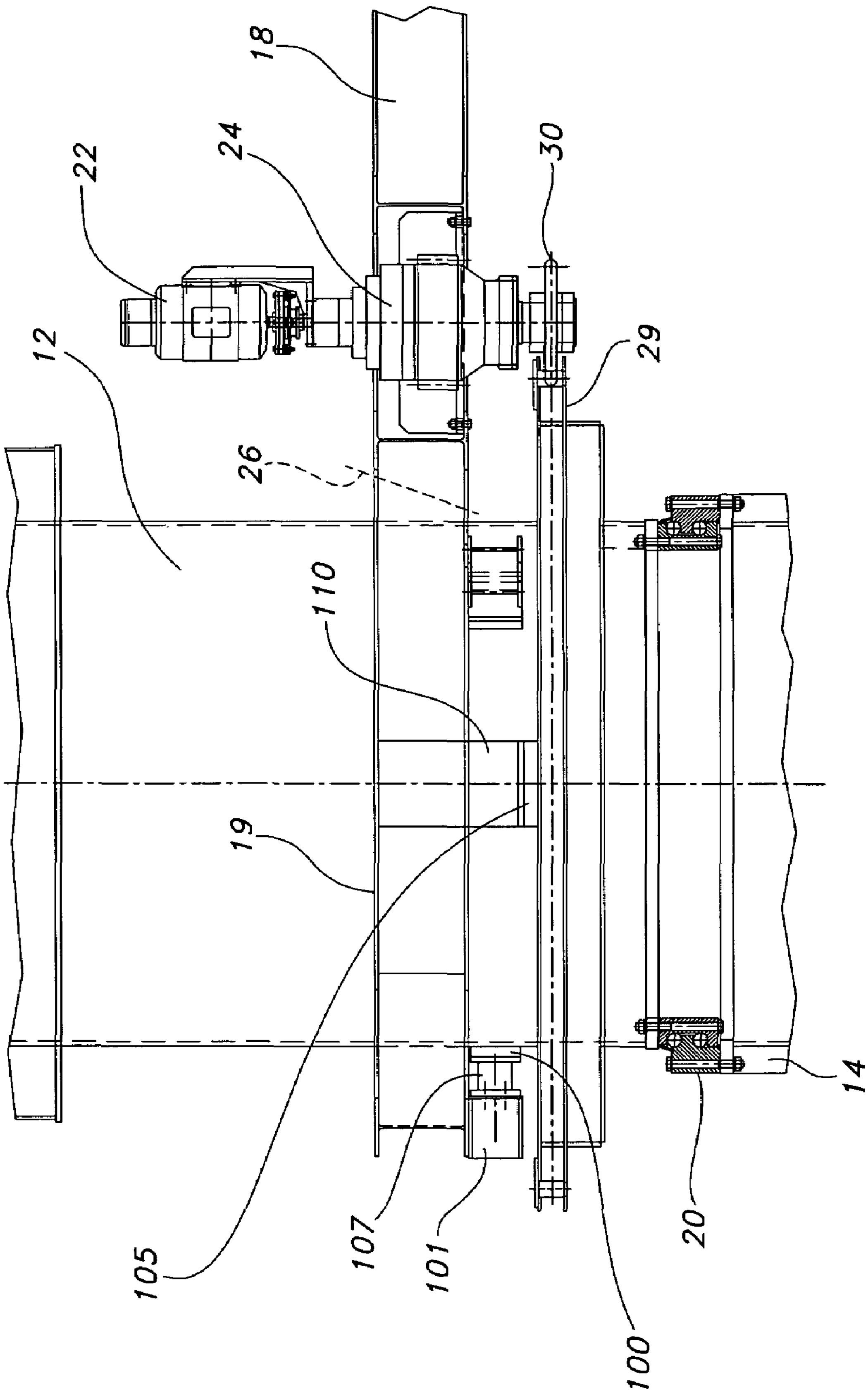
FIG. 6 is a partial elevation view showing an alternate embodiment for sliding supports locating the torque arm bearing frame relative to the stacker column.

Referring now to FIG. 6, stacker bearing 20 is mounted to stacker lower column 14 and stacker upper column 12 is mounted to stacker bearing 20. Motor brake 22, speed reducer 24 and pinion gear 30 are mounted on the torque arm 18 and torque arm bearing frame 19. Circumferential support member 29 is attached to stacker upper column 12. Torque arm bearing frame 19 is attached to torque arm 18, has connected thereto a plurality of vertical guides 105 and a plurality of horizontal guides 100. Vertical guides 105 support the torque arm bearing frame 19 on top of circumferential support member 29, and horizontal guides 100 support the torque arm bearing frame 19 concentrically with the stacker upper column 12 and serve to keep pinion gear 30 in proper mesh with bull gear 31 of circumferential support member 29. The plurality of vertical guides 105 are connected to the torque arm bearing frame 19 by means of brackets 110 or adapter blocks (not shown). The adapter blocks can be made of ultra high molecular weight plastic, such as polyethylene. The brackets or adapter blocks 110 are sized and positioned to provide support for the plurality of vertical guides 105 as they contact the upper surface of circumferential support member 29.

Figure 6B:
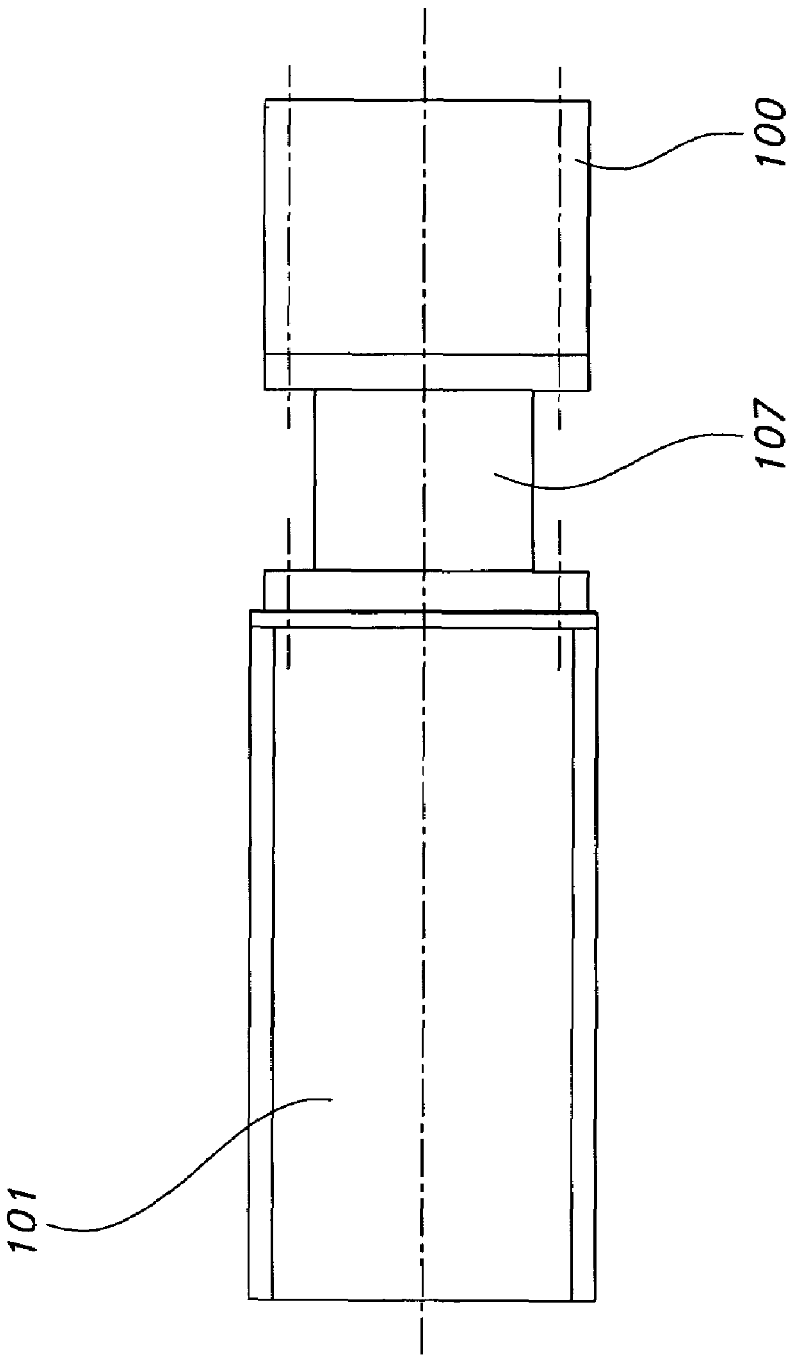
FIG. 6B is a schematic view of a horizontal guide.

Now referring to FIG. 6B, a bracket 101 is attached to torque arm bearing frame 19. A spacer 107 spaces bracket 101 from horizontal guide 100. The horizontal guide 100 can be made of a plastic, such as ultra high molecular weight polyethylene. The brackets or adapter blocks 110 are sized and positioned to provide support for the plurality of horizontal guides 100 as they contact the outer surface of stacker upper column 12. The plurality of horizontal guides 100 contact the stacker column 12. In an alternate embodiment, the plurality of horizontal guides 100 are connected to the torque arm bearing frame 19 by means of brackets or adapter blocks 107.

The improvement achieved by this invention is that the stacker machine 10 and the reclaimer machine 16 can operate independently. The upper 12 and lower stacker 14 column being separated by a single stacker bearing 20. The lower column 14 being mounted to the reclaimer machine 16 and reclaimer framework resting on the reclaimer bearing which results in a stacker machine 12 that can rotate independently of a reclaimer machine 16. The reclaimer bearing 16 is mounted to the foundation supporting the total machine. The lower 12 and upper stacker 14 column vertical axes being substantially the same vertical axis of the stacker-reclaimer apparatus 1. Additionally, the reclaimer apparatus can be mounted on wheels on a circular rail, and in combination with the reclaimer bearing connected to the foundation of the stacker-reclaimer apparatus 1 or without the reclaimer bearing and corresponding foundation (with just the wheels on circular rails).

Although the foregoing invention has been described in some detail by way of illustration and example for purposes of clarity of understanding, it will be obvious that certain changes and modifications can be made which are within the full scope of the invention.

What is claimed is:

1. A stacker-reclaimer apparatus comprising:

a. stacker machine having an upper column and a lower column, wherein said upper column and said lower column are connected through a stacker bearing;

b. a torque reaction member rotatably connected to said stacker upper column; wherein said torque reaction member comprises an arm portion and a torque arm bearing frame and said torque arm bearing frame is sized to surround said upper stacker column, and c. a reclaimer machine positioned to support said stacker lower column.

2. The stacker-reclaimer apparatus of claim 1 wherein said torque arm bearing frame has a plurality of vertical rollers connected thereto.

3. The stacker-reclaimer apparatus of claim 1 wherein said torque arm bearing frame has a plurality of horizontal rollers connected thereto.

4. The stacker-reclaimer apparatus of claim 1 wherein a circumferential support member is fixedly attached to said upper stacker column below said torque arm bearing frame.

5. The stacker-reclaimer apparatus of claim 4 wherein said torque arm bearing frame has a plurality of vertical rollers connected thereto.

6. The stacker-reclaimer apparatus of claim 5 wherein said circumferential support member contacts said plurality of vertical rollers.

7. The stacker-reclaimer apparatus of claim 4 wherein said torque arm bearing frame has a plurality of horizontal rollers connected thereto.

8. The stacker-reclaimer apparatus of claim 7 wherein said circumferential support member contacts said plurality of horizontal support rollers.

9. The stacker-reclaimer apparatus of claim 1 wherein said arm portion of said torque arm has a drive assembly attached thereto.

10. The stacker-reclaimer apparatus of claim 4 wherein said torque arm bearing frame has plurality of vertical guides connected thereto.

11. The stacker-reclaimer apparatus of claim 10 wherein said circumferential support member contacts said plurality of vertical guides.

12. The stacker-reclaimer apparatus of claim 4 wherein said torque arm bearing frame has a plurality of horizontal guides connected thereto.

13. The stacker-reclaimer apparatus of claim 12 wherein said plurality of horizontal guides are positioned to contact said upper stacker column.

14. The stacker-reclaimer apparatus of claim 12 wherein said plurality of horizontal guides are positioned to contact said circumferential support member.

15. The stacker-reclaimer apparatus of claim 4 further comprising a stacker rotational drive assembly positioned on said torque arm.

16. The stacker-reclaimer apparatus of claim 15 wherein said stacker rotational drive assembly includes a brake.

17. The stacker-reclaimer apparatus of claim 15 wherein said stacker rotational drive assembly is operably connected to said circumferential support member.

* * * * *